US010194502B2

(12) United States Patent
Steiner

(10) Patent No.: US 10,194,502 B2
(45) Date of Patent: *Jan. 29, 2019

(54) KEYPAD INTERFACE FOR PROGRAMMING A LOAD CONTROL SYSTEM

(71) Applicant: Lutron Electronics Co., Inc., Coopersburg, PA (US)

(72) Inventor: James P. Steiner, Royersford, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,797

(22) Filed: Jul. 21, 2017

(65) Prior Publication Data

US 2017/0325308 A1    Nov. 9, 2017

Related U.S. Application Data

(63) Continuation of application No. 15/154,184, filed on May 13, 2016, now Pat. No. 9,763,303.

(Continued)

(51) Int. Cl.
*H05B 37/02* (2006.01)
*H05B 33/08* (2006.01)

(52) U.S. Cl.
CPC ..... *H05B 33/0854* (2013.01); *H05B 37/0218* (2013.01); *H05B 37/0227* (2013.01);

(Continued)

(58) Field of Classification Search
CPC ............... H05B 33/08; H05B 33/0815; H05B 33/0854; H05B 37/02; H05B 37/0209;
(Continued)

(56) References Cited

U.S. PATENT DOCUMENTS

| 5,530,322 A | 6/1996 | Ference et al. |
| 7,111,952 B2 | 9/2006 | Veskovic |

(Continued)

OTHER PUBLICATIONS

U.S. Appl. No. 15/154,184.*

(Continued)

*Primary Examiner* — Jimmy Vu
(74) *Attorney, Agent, or Firm* — Condo Roccia Koptiw LLP

(57) ABSTRACT

A control device for power delivered to electrical loads in a load control system via respective load control devices may comprise a programming user interface for programming the operation of the load control system. The control device may be configured to select one or more load control devices in response to successive actuations of a programming button of the programming interface. The control device may be configured to controllably illuminate visual indicators of the programming interface to indicate which of the load control devices is selected in response to successive actuations of the programming button. The control device may transmit programming information to the load control devices. The programming information may determine which of the load control devices are responsive to a digital message transmitted on the digital communication link.

20 Claims, 7 Drawing Sheets

Related U.S. Application Data

(60) Provisional application No. 62/162,196, filed on May 15, 2015.

(52) U.S. Cl.
CPC ........ *H05B 37/0254* (2013.01); *Y02B 20/343* (2013.01); *Y02B 20/42* (2013.01); *Y02B 20/46* (2013.01)

(58) Field of Classification Search
CPC ............ H05B 37/0218; H05B 37/0227; H05B 37/0254; H05B 37/00
USPC ........ 315/130–134, 291, 307, 308, 361, 363
See application file for complete search history.

(56) References Cited

U.S. PATENT DOCUMENTS

| | | |
|---|---|---|
| 7,190,125 B2 | 3/2007 | McDonough et al. |
| 7,211,968 B2 | 5/2007 | Adamson et al. |
| 7,796,057 B2 | 9/2010 | Swatsky et al. |
| 8,077,058 B2 | 12/2011 | Swatsky et al. |
| 8,199,010 B2 | 6/2012 | Sloan et al. |
| 8,228,163 B2 | 7/2012 | Cash et al. |
| 8,228,184 B2 | 7/2012 | Blakeley et al. |
| 8,306,051 B2 | 11/2012 | Stocker |
| 8,417,388 B2 | 4/2013 | Altonen et al. |
| 8,802,980 B2 | 8/2014 | Shivell et al. |
| 9,763,303 B2* | 9/2017 | Steiner ............... H05B 33/0854 |
| 9,965,047 B2* | 5/2018 | Kirkpatrick ........... G06F 3/0238 |
| 2013/0181630 A1 | 7/2013 | Taipale et al. |
| 2014/0265880 A1 | 9/2014 | Taipale et al. |

OTHER PUBLICATIONS

Maestro, "0-10 V Dimmer Sensor-Setting the New Standard for 0-10 V Control", Lutron Electronics Co., Inc., Sep. 2014, 8 pages.
Maestro, "Dual Circuit Dual Technology Sensing Switch Installation Guide", Lutron Electronics Co., Inc., Dec. 2013, 6 pages.

* cited by examiner

KEYPAD INTERFACE FOR PROGRAMMING A LOAD CONTROL SYSTEM

CROSS-REFERENCE TO RELATED APPLICATIONS

This application is a continuation of U.S. patent application Ser. No. 15/154,184, filed May 13, 2016, which claims the benefit of U.S. Provisional Patent Application No. 62/162,196, filed May 15, 2015, the entire disclosures of which are incorporated by reference herein.

BACKGROUND

A user environment, such as a residence or an office building for example, may be configured using various types of load control systems. A load control system may control the amount of power delivered to one or more electrical loads. A lighting control system may be used to control the lighting loads in the user environment. A motorized window treatment control system may be used to control the natural light provided to the user environment. A heating, ventilation, and air conditioning (HVAC) system may be used to control the temperature in the user environment. Each load control system may include various devices for controlling the electrical loads.

The devices for controlling the electrical loads may also be used to program the load control system. The devices for controlling the electrical loads may include a dedicated button or a limited number of buttons for programming the devices in the load control system. Additional programming buttons on the devices may increase the complexity of the devices for controlling the electrical loads in the load control system after performing the programming. Further, the buttons on the devices may have dual functionality, such that a single button may be used for controlling and programming the load control system. If the buttons have dual functionality, the programming and the control of the load control system may be difficult and unintuitive. This complexity may add significant time and cost to the load control system requiring additional investment for commissioning and startup.

SUMMARY

As described herein, a control device for use in a load control system provides an intuitive programming user interface that allows for configuration (e.g., programming) of the operation of the load control system and may greatly reduce startup time and cost for the load control system. The load control system may include first and second load control devices configured to control power delivered to respective electrical loads of the load control system. The programming user interface of the control device may have a programming button adapted to be actuated by a user. The control device may also comprise a communication circuit configured to transmit digital messages to the load control devices via a digital communication link and a control circuit responsive to actuations of the programming button. The control circuit may be configured to select the first load control device, the second load control device, or both of the load control devices in response to successive actuations of the programming button. The control circuit may be configured to cause the communication circuit to transmit programming information to the load control devices in response to the successive actuations of the programming button. The programming information may determine which of the load control devices are responsive to a digital message transmitted on the digital communication link.

The programming user interface may also comprise at least two visual indicators configured to be controllably illuminated in response to the control circuit. The control circuit may be configured to controllably illuminate each of the at least two visual indicators to indicate which of the load control devices is selected in response to successive actuations of the programming button. The control circuit may be configured to illuminate a single visual indicator to indicate that a single load control device is selected and/or to illuminate multiple visual indicators to indicate that multiple load control devices are selected.

DETAILED DESCRIPTION

Figure 1:
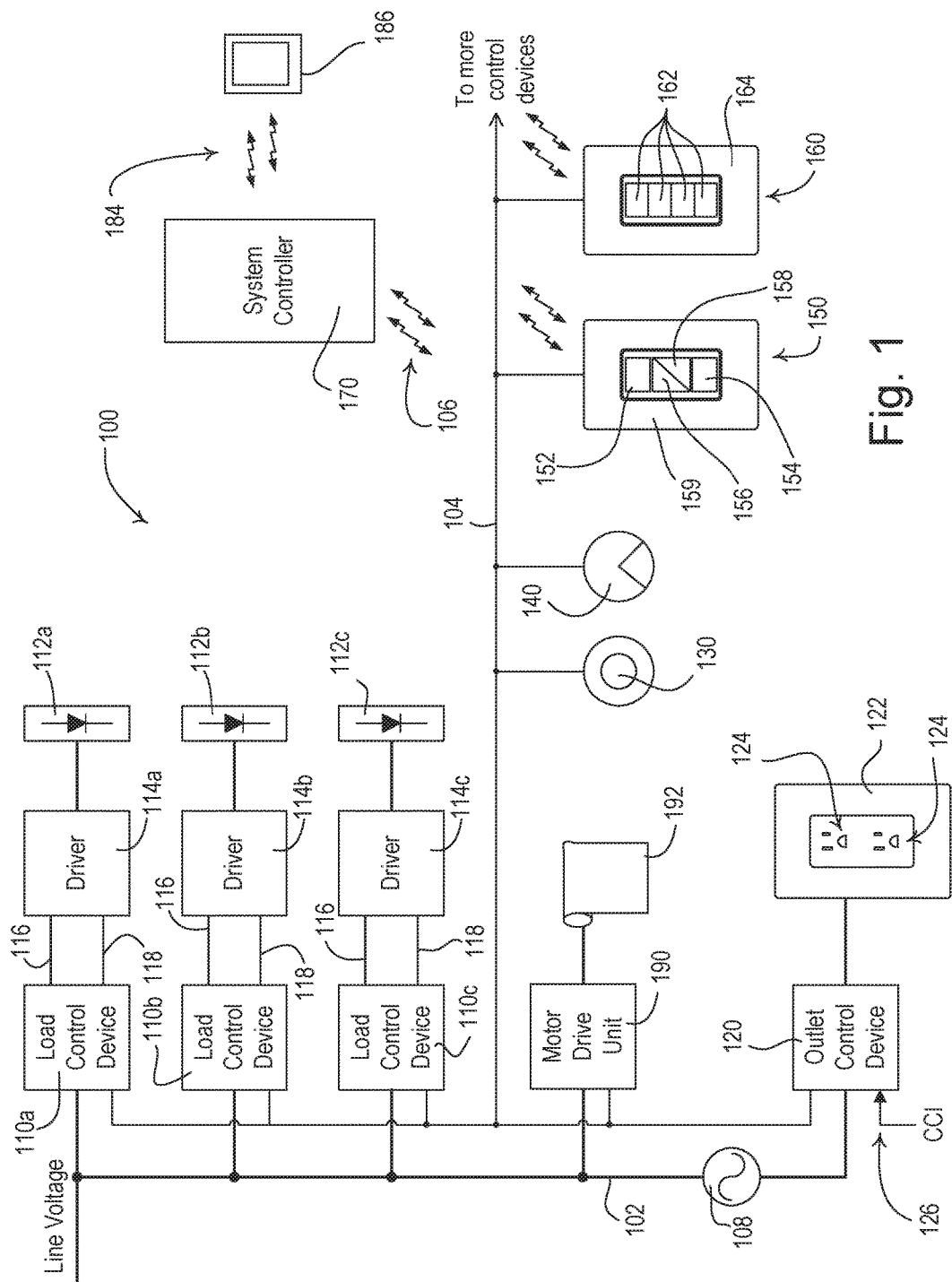
FIG. 1 is a wiring diagram of an example load control system having a plurality of load control devices coupled to a wired digital communication link.

FIG. 1 is a wiring diagram of an example load control system 100. As shown in FIG. 1, the load control system may include various types of control devices for controlling electrical loads. The control devices may include load control devices and/or input devices. An input device may indirectly control the amount of power provided to an electrical load by transmitting digital messages to a load control device. A load control device may directly control the amount of power provided to the electrical load based on the digital messages received from an input device. The digital messages may include control instructions (e.g., load control instructions) or another indication (e.g., measurement) that causes the load control device to determine load control instructions for controlling an electrical load. The digital messages may include programming information for programming the load control system 100.

Control devices (e.g., load control devices and/or input devices) may communicate with each other and/or other devices via a wired and/or a wireless signal. For example, the load control devices may receive communications from the input devices via wired and/or wireless communications. The control devices may communicate via a radio frequency (RF) signals 106. The RF signals 106 may be presented via any known RF communication (e.g., near field communication (NFC); BLUETOOTH®; ZIGBEE®, WI-FI®; a proprietary communication channel, such as CLEAR CONNECT™, etc.). A control device may be a one-way communication device capable of transmitting or receiving digital messages via the RF signals 106, or a two-way communication device capable of transmitting and receiving digital messages via the RF signals 106.

The load control devices may include a plurality of load control devices 110a, 110b, 110c for controlling electrical loads. The load control devices 110a, 110b, 110c may be configured to receive power from an AC power source 108 via line voltage wiring 102. For example, the load control devices 110a, 110b, 110c may each be configured to control the power delivered to a lighting load 112a, 112b, 112c, respectively, which may comprise, for example, a light source (e.g., a light emitting diode (LED) light source 112a, 112b, 112c), and a respective load regulation device (e.g., an LED driver 114a, 114b, 114c) for controlling the LED light source.

The load control devices 110a, 110b, 110c may be configured to provide power to the drivers 114a, 114b, 114c via power wiring 116. The load control devices 110a, 110b, 110c may also be configured to generate one or more control signals, which may be provided to the drivers 114a, 114b, 114c via control wiring 118 for controlling the LED light sources 112a, 112b, 112c. The load control devices 110a, 110b, 110c may be mounted to an internal or external surface of the respective fixture or to a junction box located adjacent to the fixture. An example of an assembly of a control module is described in greater detail in commonly-assigned U.S. Patent Application Publication No. 2012/0313456, published Dec. 13, 2012, entitled LOAD CONTROL DEVICE HAVING AN ELECTRICALLY ISOLATED ANTENNA, the entire disclosure of which is hereby incorporated by reference.

The drivers 114a, 114b, 114c may be configured to turn the respective light sources 112a, 112b, 112c on and off and/or to adjust the intensity of the light sources 112a, 112b, 112c between a low-end (minimum) intensity $L_{LE}$ and a high-end (maximum) intensity $L_{HE}$. The drivers 114a, 114b, 114c may be configured to control the power delivered to the light sources 112a, 112b, 112c, for example, by regulating the voltage generated across the light source and/or regulating the current conducted through the light source. Examples of LED drivers are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Patent Application Publication No. 2014/0009084, published Jan. 9, 2014, entitled FORWARD CONVERTER HAVING A PRIMARY-SIDE CURRENT SENSE CIRCUIT, the entire disclosures of which are hereby incorporated by reference. As shown in FIG. 1, the load control system 100 may comprise separate load control devices 110a, 110b, 110c for controlling the respective drivers 114a, 114b, 114c and light sources 112a, 112b, 112c. Alternatively, or additionally, the load control system 100 may comprise a multi-zone load control device able to separately control the power delivered to a plurality of drivers 114a, 114b, 114c (e.g., three or more drivers) and the intensity of a plurality of respective light sources 112a, 112b, 112c (e.g., three or more light sources).

Each driver 114a, 114b, 114c may be configured to control the power delivered to the respective light source 112a, 112b, 112c, and thus the intensity of the light source in response to the control signals received via the control wiring 118. The control signals generated by each load control device 110a, 110b, 110c, for controlling the respective driver 114a, 114b, 114c, may comprise, for example, 0-10 volt (V) control signals. A 0-10V control signal may have a direct current (DC) magnitude that ranges between zero and ten volts and indicates a target intensity for the respective light source 112a, 112b, 112c. When receiving the 0-10V control signal, the driver 114a, 114b, 114c may control the respective light source 112a, 112b, 112c to the low-end intensity $L_{LE}$ when the 0-10V control signal has a magnitude of one volt, to the high-end intensity $L_{HE}$ when the 0-10V control signal has a magnitude of ten volts, and to an intensity that is linearly scaled between the low-end intensity $L_{LE}$ and the high-end intensity $L_{HE}$ when the 0-10V control signal has a magnitude between one and ten volts.

The load control system 100 may include other load control devices, for example a daylight control device, such as a motor drive unit 190 of a motorized window treatment. As shown in FIG. 1, the motor drive unit 190 may be configured to control a position of a covering material 192 (e.g., a shade fabric) of a motorized roller shade, for example. The motor drive unit 190 may control an electrical load, such as an electrical motor, to adjust the position of the covering material 192 of the motorized window treatment to adjust the amount of daylight entering a space. The motor drive unit 190 may be configured to receive power from the AC power source 108 via the line voltage wiring 102. The motor drive unit 190 may control other types of devices for controlling the amount of daylight entering a space, such as, for example, a cellular shade, a drapery, a Roman shade, a Venetian blind, a Persian blind, a pleated blind, a tensioned roller shade systems, an electrochromic or smart window, and/or other suitable devices. Examples of motorized window treatments are described in greater detail in commonly-assigned U.S. Pat. No. 6,983,783, issued Jan. 10, 2006, entitled MOTORIZED SHADE CONTROL SYSTEM, and U.S. Pat. No. 8,950,461, issued Feb. 10, 2015, entitled MOTORIZED WINDOW TREATMENT, the entire disclosures of which are hereby incorporated by reference.

The load control system 100 may comprise other load control devices, such as one or more electrical outlet control devices 120 for controlling the power delivered to one or more electrical outlets 122. Each electrical outlet 122 may include one or more electrical receptacles 124 into which plug-in electrical loads (e.g., appliances) may be plugged to receive power from the AC power source 108. The electrical outlet control device 120 may be configured to turn on and off one or more of the electrical outlets 122 and/or one or more of the plug-in electrical loads plugged into the electrical receptacles 124. The electrical outlet control device 120 may be configured to control the power delivered to one or both of the electrical receptacles 124 of each electrical outlet 122. The electrical outlet control device 120 may comprise a contact closure input (CCI) 126 for receiving a contact closure from an external device and/or system (e.g., a timeclock device). For example, the electrical outlet control device 120 may be configured to provide power to the electrical outlets 124 when the contact closure is asserted and to disconnect power from the electrical outlets when the contact closure is not asserted in response to a timeclock device, for example, to turn the plug-in electrical loads on during a daytime period and off during a nighttime period.

The load control system 100 may comprise other types of electrical loads, such as, for example, lighting loads (such as incandescent lamps, halogen lamps, electronic low-voltage lighting loads, and magnetic low-voltage lighting loads); dimming ballasts for driving gas-discharge lamps; table or floor lamps; screw-in luminaires including dimmer circuits and incandescent or halogen lamps; screw-in luminaires including ballasts and compact fluorescent lamps; screw-in luminaires including LED drivers and LED light sources; motor loads, such as ceiling fans and exhaust fans; projection screens; motorized interior or exterior shutters; heating and/or cooling systems; heating, ventilation, and air-conditioning (HVAC) systems; air conditioners; compressors; electric baseboard heater controllers; controllable dampers; variable air volume controllers; fresh air intake controllers; ventilation controllers; hydraulic valves for use in radiators and radiant heating system; humidity control units; humidifiers; dehumidifiers; water heaters; boiler controllers; pool pumps; refrigerators; freezers; appliances; televisions; computer monitors; printers; copiers; fax machines; video cameras; audio systems; amplifiers; speakers; overhead projectors; visual presenters; smart boards; coffee makers; toasters; elevators; power supplies; generators; electric chargers; electric vehicle chargers; medical devices; alternative energy controllers; and/or any combination of these electrical loads.

The load control devices 110a, 110b, 110c, the motor drive unit 190, and the electrical outlet control device 120 may be coupled to a digital communication link 104 to allow for communication between each other, as well as to allow for reception of digital messages (e.g., including commands) from input devices. For example, the digital communication link 104 may comprise a wired digital communication link.

The load control system 100 may comprise one or more input devices coupled to the digital communication link 104 for transmitting digital messages to the load control devices 110a, 110b, 110c, the motor drive unit 190, and/or the electrical outlet control device 120 for controlling the respective electrical loads. The input devices of the load control system 100 may comprise an occupancy sensor 130, a daylight sensor 140, and/or one or more keypad devices, for example, a zone-control keypad device 150 and/or a preset-control keypad device 160. Each of the load control devices 110a, 110b, 110c, the motor drive unit 190, the electrical outlet control device 120, the occupancy sensor 130, the daylight sensor 140, the zone-control keypad device 150, and/or the preset-control keypad device 160 may comprise an internal communication circuit to provide for communication (e.g., transmission and reception) of the digital messages on the digital communication link 104.

The occupancy sensor 130 may be configured to detect occupancy and vacancy conditions in the room in which the LED light sources 112a, 112b, 112c are installed. The occupancy sensor 130 may be configured to transmit digital messages indicating occupancy and/or vacancy conditions in the room via the digital communication link 104. The load control devices 110a, 110b, 110c may each be configured to control the respective driver 114a, 114b, 114c in response to the digital messages received from the occupancy sensor 130 via the digital communication link 104. For example, each load control device 110a, 110b, 110c may be configured to operate in an "occupancy" mode. In the occupancy mode, the load control devices 110a, 110b, 110c may turn on the respective LED light sources 112a, 112b, 112c in response to determining that the room is occupied and may turn off the respective LED light sources 112a, 112b, 112c in response to determining that the room is unoccupied (e.g., as with an "occupancy" sensor).

Each of the load control devices 110a, 110b, 110c may be configured to operate in a "vacancy" mode. In the vacancy mode, the load control devices 110a, 110b, 110c may turn off the respective LED light sources 112a, 112b, 112c in response to determining that the room is unoccupied and may not turn on the respective LED light sources 112a, 112b, 112c in response to determining that the space is occupied (e.g., as with an "vacancy" sensor). Examples of load control systems having occupancy and vacancy sensors are described in greater detail in commonly-assigned U.S. Pat. No. 8,228,184, issued Jul. 24, 2012, entitled BATTERY-POWERED OCCUPANCY SENSOR, the entire disclosure of which is hereby incorporated by reference.

The motor drive unit 190 may be configured to control the respective covering material 192 in response to the digital messages received from the occupancy sensor 130 via the digital communication link 104. In the occupancy mode, the motor drive unit 190 may set the covering material 192 to a predefined level in response to determining that the room is occupied and may set the covering material 192 to a different predefined level in response to determining that the room is unoccupied (e.g., as with an "occupancy" sensor). In the vacancy mode, the motor drive unit 190 may set the covering material 192 to a predefined level in response to determining that the room is unoccupied and may not set the covering material 192 to a predefined level in response to determining that the space is occupied (e.g., as with an "vacancy" sensor).

The electrical outlet control device 120 may be configured to turn on and off one or more of the electrical outlets 122 and/or one or more of the plug-in electrical loads plugged into the electrical receptacles 124 in response to the digital messages received from the occupancy sensor 130 via the digital communication link 104. The electrical outlet control device 120 may be configured to override the control provided by the contact closure input 126 in response to the digital messages received via the digital communication link 104.

The daylight sensor 140 may be configured to measure a light intensity in the room in which the LED light sources 112a, 112b, 112c are installed (e.g., at the daylight sensor). The daylight sensor 140 may be configured to transmit digital messages including the measured light intensity via the digital communication link 104. The load control devices 110a, 110b, 110c may each be configured to control the respective driver 114a, 114b, 114c in response to the light intensity measured by the daylight sensor 140. Examples of load control systems having daylight sensors are described in greater detail in commonly-assigned U.S. Pat. No. 8,410,706, issued Apr. 2, 2013, entitled METHOD OF CALIBRATING A DAYLIGHT SENSOR, the entire disclosure of which is hereby incorporated by reference.

The zone-control keypad device 150 and the preset-control keypad device 160 may each be coupled to the digital communication link 104 for transmitting and receiving digital messages. The zone-control keypad device 150 may comprise one or more control buttons, e.g., an on button 152, an off button 154, a raise button 156, and/or a lower button 158, received through the opening of a faceplate 159. The preset-control keypad device 160 may comprise a plurality of preset buttons 162 (e.g., four preset buttons) received through an opening of a faceplate 164. The zone-control keypad device 150 and the preset-control keypad device 160 may be configured to transmit digital messages to the load control devices 110a, 110b, 110c, the motor drive unit 190, and/or the electrical outlet control device 120 for controlling the respective electrical loads in response to actuations of the respective buttons 152-158, 162. For example, the load control devices 110a, 110b, 110c may be configured to turn on and off the respective LED light sources 112a, 112b, 112c in response to actuations of the on and off buttons 152, 154 of the zone-control keypad device 150, respectively. The load control devices 110a, 110b, 110c may be configured to raise and lower the intensities of the respective LED light sources 112a, 112b, 112c (e.g., by predetermined amounts) in response to actuations of the raise and lower buttons 156, 158 of the zone-control keypad device 150, respectively. The load control devices 110a, 110b, 110c may be configured to adjust the intensities of the respective LED light sources 112a, 112b, 112c to respective preset intensities in response to an actuation of one of the preset buttons 162 of the preset-control keypad device 160. The motor drive unit 190 may be configured to adjust the position of the covering material 192 in response to an actuation of one of the preset buttons 162 of the preset-control keypad device 160.

The input devices of the load control system 100 may comprise a system controller 170 (e.g., a central controller, a bridge, or a gateway device). The system controller 170 may be configured to transmit digital messages via wireless signals, e.g., radio-frequency (RF) signals 106, to one or more of the control devices of the load control system 100. For example, system controller 170 may be configured to transmit digital messages via wireless signals, e.g., radio-frequency (RF) signals 106, to the zone-control keypad device 150 and/or the preset-control keypad device 160. The zone-control keypad device 150 and the preset-control keypad device 160 may be configured to transmit digital messages to the load control devices 110a, 110b, 110c, the motor drive unit 190, and/or the electrical outlet control device 120 for controlling the respective electrical loads in response to the digital messages received from the system controller 170 via the RF signals 106. The motor drive unit 190 may be configured to adjust the position of the covering material 192 in response to digital messages received from the system controller 170 via the digital communication link.

The system controller 170 may be configured to communicate with a network (e.g., a wireless or wired local area network) for access to the Internet. For example, the system controller 170 may be configured to transmit and/or receive digital messages (e.g., Internet Protocol packets) via the network from a network device 186, such as a smart phone (e.g., an iPhone® smart phone, an Android® smart phone, or a Blackberry® smart phone), a personal computer, a laptop, a wireless-capable media device (e.g., MP3 player, gaming device, or television), a tablet device, (e.g., an iPad® handheld computing device), a Wi-Fi or wireless-communication-capable television, or any other suitable Internet-Protocol-enabled device. The system controller 170 may communicate digital messages with the network device 186 via RF signals 106 (e.g., NFC; BLUETOOTH®; WI-FI®; cellular; a proprietary communication channel, such as CLEAR CONNECT™, etc.). The system controller 170 may communicate over the Internet, or other network, using RF communication signals 184. The RF communication signals 184 may be transmitted using a different protocol and/or wireless band than the RF communication signals 106. For example, the RF communication signals 184 may be transmitted using WI-FI® or cellular signals and the RF communication signals 106 may be transmitted using another RF communication protocol, such as BLUETOOTH® or a proprietary communication protocol. The RF communication signals 184 may be transmitted using the same protocol and/or wireless band than the RF communication signals 106. For example, the RF communication signals 184 and the RF communication signals 106 may be transmitted using WI-FI® or a proprietary communication protocol. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 170 may operate as a central controller for the load control system 100, or may operate as a gateway device to relay digital messages between the network and the zone-control keypad device 150 and/or the preset-control keypad device 160. The system controller 170 may be configured to transmit digital messages via the RF signals 106 to the zone-control keypad device 150 and/or the preset-control keypad device 160 for controlling the load control devices 110a, 110b, 110c, the motor drive unit 190, and/or the electrical outlet control device 120, and thus, the respective electrical loads. Accordingly, the load control devices 110a, 110b, 110c, the motor drive unit 190, and/or the electrical outlet control device 120 may be responsive to data received by the system controller 170 from the Internet, such as weather information, automated demand response, and emergency status information. The system controller 170 may be configured to transmit digital messages including one of: a timeclock command, a load shed command, a demand response command, a peak demand command, and/or time-of-day pricing information. The system controller 170 may be configured to control the load control devices 110a, 110b, 110c, the motor drive unit 190, and/or the electrical outlet control device 120 in accordance with one or more timeclock events of a timeclock schedule, for example, to turn on the electrical loads during the day and to turn off the electrical loads at night. The load control devices 110a, 110b, 110c, the motor drive unit 190, and/or the electrical outlet control device 120 may be configured to transmit feedback information, such as the status and energy consumption of the controlled loads, back to the system controller 170, which may be configured to report the information to external devices (e.g., network device 186) via the network.

The load control system 100 may also comprise other types of input devices, such as, for example, cloudy-day sensors; shadow sensors; window sensors; radiometers; temperature sensors; humidity sensors; CMOS image sensors; thermopile sensor arrays; thermal image sensors; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices (such as fire protection, water protection, and/or medical emergency devices); power monitoring devices (such as power meters, energy meters, utility sub-meters, and/or utility rate meters); residential, commercial, or industrial controllers; interface devices with other control systems (such as security systems and emergency alert systems); or any combination of these input devices.

The control devices of the load control system 100 may be configured to operate with a default functionality "out-of-box" (e.g., immediately after being installed and powered up for the first time). For example, the load control devices 110a, 110b, 110c in the load control system 100 may be responsive to the occupancy sensor 130, the zone-control keypad device 150, and/or the preset-control keypad device 160 in the default configuration. The load control devices 110a, 110b, 110c may be configured to control the intensities of the respective light sources 112a, 112b, 112c to predetermined preset intensities (e.g., 100%, 75%, 50%, and 0% or off) in response to actuations of the preset buttons 162 of the preset-control keypad device 160 in the default configuration. In the default configuration, the load control devices 110a, 110b, 110c may be configured to turn the lights on and off in response to the occupancy sensor 130 (e.g., with or without the presence of keypad devices, such as the zone-control keypad device 150 or the preset-control keypad device 160) installed in the load control system 100, and to turn the lights off in response to the occupancy sensor if at least one keypad device is installed in the load control system (e.g., without turning the light on in response to the occupancy sensor). In the default configuration, a first one of the load control devices 110a, 110b, 110c may operate as a first daylighting zone (e.g., with a first gain) in response to the daylight sensor 140 and a second one of load control devices 110a, 110b, 110c may operate as a second daylighting zone (e.g., with a second gain less than the first gain) in response to the daylight sensor 140. If other lighting control devices are included in the load control system, they may operate a different daylighting zone, or they may be unresponsive to the daylight sensor 140. In the default configuration, the electrical outlet control device 120 may be configured to turn the plug-in electrical loads on if the contact closure is asserted or control the plug-in electrical loads in response to the occupancy sensor 130 (e.g., off and on) if the contact closure is not asserted.

The motor drive unit 190 may be configured to control the level of the covering material 192 to a predetermined preset level (e.g., fully-open, 75% open, 50% open, and 0% open or fully-closed). The motor drive unit 190 may be programmed using the preset-control keypad 160 in a similar fashion as the load control devices 110a, 110b, 110c. For example, the motor drive unit 190 may be configured to control the level of the covering material 192 to a predetermined preset level in response to actuations of the preset buttons 162 of the preset-control keypad device 160 in the default configuration. The motor drive unit 190 may be configured to set the covering material 192 to a preset level in response to the occupancy sensor 130 (e.g., with or without the presence of keypad devices, such as the zone-control keypad device 150 or the preset-control keypad device 160) installed in the load control system 100. The motor drive unit 190 may operate to set the covering material 192 to a first level in response to the daylight sensor 140 and a second load control device operating as a motorized window treatment may operate to set a respective covering material to a second level in response to the daylight sensor 140. If other motorized window treatments are included in the load control system, they may operate to set the respective covering material to another level, or they may be unresponsive to the daylight sensor 140.

One or more of the keypad devices (e.g., the zone-control keypad device 150 and/or the preset-control keypad device 160) may be configured to adjust the operation of the load control system 100, e.g., to override the default configuration. The zone-control keypad device 150 and/or the preset-control keypad device 160 may each comprise a programming user interface including programming buttons for adjusting the operation of the load control system 100. For example, the programming buttons of the zone-control keypad device 150 and/or the preset-control keypad device 160 may be actuated to adjust which of the load control devices 110a, 110b, 110c are responsive to the occupancy sensor 130, the daylight sensor 140, the zone-control keypad device 150, and/or the preset-control keypad device 160. The programming buttons of the zone-control keypad device 150 and/or the preset-control keypad device 160 may be actuated to adjust an operating parameter of the load control system 100, such as, for example, the low-end intensity $L_{LE}$, the high-end intensity $L_{HE}$, and/or a preset intensity of one or more of the load control devices 110a, 110b, 110c. The programming buttons of the zone-control keypad device 150 and/or the preset-control keypad device 160 may be actuated to adjust a preset level of the covering material 192 of the motor drive unit 190.

The zone-control keypad device 150, and/or the preset-control keypad device 160 may be configured to transmit programming information (e.g., grouping information) to the load control devices 110a, 110b, 110c, the motor drive unit 190, and/or the electrical outlet control device 120 in response to actuations of the respective programming buttons. The programming information may determine which of the load control devices 110a, 110b, 110c, the motor drive unit 190, and/or the electrical outlet control device 120 are responsive to digital messages transmitted on the digital communication link 104. The programming information may comprise, for example, serial numbers or other unique identifiers of one or more of the input devices (e.g., the occupancy sensor 130, the daylight sensor 140, the zone-control keypad device 150, and/or the preset-control keypad device 160). The programming information may identify the keypad devices themselves (e.g., the zone-control keypad device 150 and/or the preset-control keypad device 160) and/or external control devices (e.g., the occupancy sensor 130, the daylight sensor 140, the network device 186, etc.). For example, the programming buttons of the zone-control keypad device 150 may be actuated to choose which of the load control devices 110a, 110b, 110c, the motor drive unit 190, and/or the electrical outlet control device 120 are responsive to the occupancy sensor 130 or the daylight sensor 140. The zone-control keypad device 150 may transmit a serial number of the occupancy sensor 130 to the selected load control devices 110a, 110b, 110c, the motor drive unit 190, and/or the electrical outlet control device 120, which may store the serial number in memory and may be subsequently be responsive to digital messages including the stored serial numbers.

Figure 2:
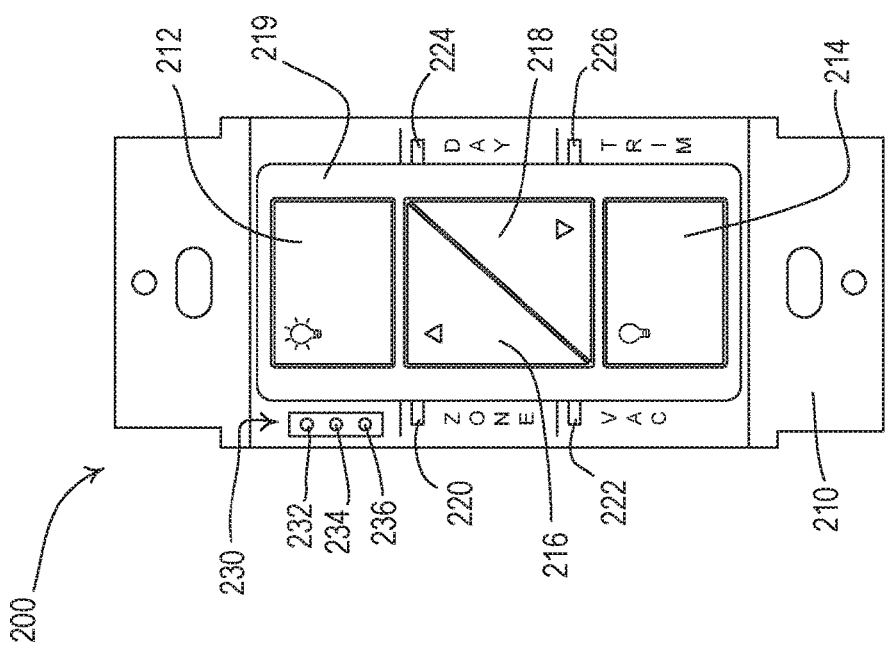
FIG. 2 is a front view of an example zone-control keypad device having a plurality of programming buttons.

FIG. 2 is a front view of an example zone-control keypad device 200, which may be deployed as the zone-control keypad device 150 of the load control system 100 shown in FIG. 1. As shown in FIG. 2, the zone-control keypad device 200 does not have a faceplate (e.g., the faceplate 159) mounted to the device. The zone-control keypad device 200 may comprise a yoke 210 for mounting the zone-control keypad device 200 to a standard electrical wallbox. The zone-control keypad device 200 may comprise a plurality of control buttons, e.g., an on button 212, an off button 214, a raise button 216, and/or a lower button 218, provided in a bezel 219. The bezel 219 may be received in the opening of the faceplate when the faceplate is mounted to the yoke 210. The zone-control keypad device 200 may be configured to transmit digital messages for controlling one or more electrical loads (e.g., the light sources 112a, 112b, 112c, etc.) in response to actuations of the buttons 212-218 (e.g., in a similar manner as the zone-control keypad device 150).

The zone-control keypad device 200 may comprise a programming user interface including one or more programming buttons for programming the load control system 100 during a programming mode. For example, the zone-control keypad device 200 may comprise a zone programming button 220 for adjusting which of the load control devices 110a, 110b, 110c are responsive to the digital messages transmitted by the zone-control keypad device in response to actuations of the buttons 212-218. The zone-control keypad device 200 may comprise a vacancy programming button 222 to designate which of the load control devices 110a, 110b, 110c operate in the occupancy mode or the vacancy mode (e.g., to determine how the load control devices respond to the digital messages transmitted by the occupancy sensor 130). The zone-control keypad device 200 may comprise a daylighting programming button 224 to designate which of the load control devices 110a, 110b, 110c are responsive to the digital messages transmitted by the daylight sensor 140. The zone-control keypad device 200 may comprise a trim programming button 226 for selecting one or more of the load control devices 110a, 110b, 110c before adjusting an operating parameter, such as, for example, the low-end intensity $L_{LE}$, the high-end intensity $L_{HE}$, a preset intensity, and/or a preset level of the covering material of the selected load control devices.

The programming user interface of the zone-control keypad device 200 may include a programming visual display 230, which may comprise visual indicators 232, 234, 236 (e.g., LEDs). The visual indicators 232-236 may be illuminated to indicate which of the load control devices 110a, 110b, 110c are selected during the programming mode. For example, one of the visual indicators 232-236 may be illuminated to indicate that one of the load control devices 110a, 110b, 110c is selected. Multiple visual indicators 232-236 may be illuminated to indicate that multiple load control devices 110a, 110b, 110c are selected. The zone-control keypad device 200 may comprise a suitable control circuit for receiving inputs from the control buttons 212-218 and the programming buttons 220-226, and for controlling the visual indicators 232-236. The control circuit may comprise one or more of a processor (e.g., a microprocessor), a microcontroller, a programmable logic device (PLD), a field programmable gate array (FPGA), an application specific integrated circuit (ASIC), or any suitable processing device. The control circuit may also be coupled to a communication circuit to provide for communication (e.g., transmission and reception) of the digital messages on a digital communication link (e.g., the digital communication link 104).

The programming buttons 220-226 and the visual display 230 may be located in the yoke 210 adjacent to the bezel 219 and may be covered by a faceplate mounted to the yoke. The programming buttons 220-226 and the visual display 230 may be exposed to a user when the faceplate is dismounted from the zone-control keypad device as shown in FIG. 2.

To assign the zone-control keypad device 200 to one or more load control devices 110a, 110b, 110c, a user may press and hold the zone programming button 220 for a predetermined amount of time (e.g., three seconds) to enter a zone programming mode. The visual indicators 232-236 of the visual display 230 may flash after the zone programming button 220 has been held for the predetermined amount of time. The user may repetitively press the zone programming button 220, while in the zone programming mode, to select different load control device(s) 110a, 110b, 110c until the visual indicator(s) 232-236 indicating the desired load control device(s) 110a, 110b, 110c are selected (e.g., to cycle through the load control devices and groups of the load control devices). The selected load control device(s) 110a, 110b, 110c may flash the respective light source(s) 112a, 112b, 112c, to identify the respective load control device(s) 110a, 110b, 110c at this time. The user may press and hold the zone programming button 220 for a predetermined amount of time (e.g., three seconds) to exit the zone programming mode. The exiting of the zone programming mode may be indicated by the visual indicators 232-236 flashing and/or turning off. The zone-control keypad device 200 may transmit (e.g., in response to the exiting of the zone programming mode) to the selected load control device(s) 110a, 110b, 110c programming information indicating that the load control device(s) 110a, 110b, 110c are responsive to the zone-control keypad device 200. For example, the zone-control keypad device 200 may transmit a zone identifier for which the selected load control device(s) 110a, 110b, 110c may be responsive when the zone identifier is identified in digital messages. The predetermined amount of time that the zone programming button 220 is pressed for entering the zone programming mode may be the same as, or different from, the amount of time the zone programming button 220 is pressed for exiting the zone programming mode.

To program one of more of the load control devices 110a, 110b, 110c to enter the vacancy programming mode to operate in the vacancy mode (rather than the occupancy mode), the user may press and hold the vacancy programming button 222 for a predetermined amount of time. The visual indicators 232-236 of the visual display 230 may flash after the vacancy programming button 222 has been held for the predetermined amount of time. The user may repetitively press the vacancy programming button 222, while in the vacancy programming mode, to select different load control device(s) 110a, 110b, 110c until the visual indicator(s) 232-236 indicating the desired load control device(s) 110a, 110b, 110c are selected. The selected load control device(s) 110a, 110b, 110c may flash the respective light source(s) 112a, 112b, 112c, to identify the respective load control device(s) 110a, 110b, 110c at this time. The user may press and hold the vacancy programming button 222 for a predetermined amount of time to exit the vacancy programming mode. The exiting of the vacancy programming mode may be indicated by the visual indicators 232-236 flashing and/or turning off. The zone-control keypad device 200 may transmit (e.g., in response to the exiting of the vacancy programming mode) to the selected load control device(s) 110a, 110b, 110c programming information indicating that the load control device(s) 110a, 110b, 110c that are to operate in the vacancy mode in response to digital messages transmitted by the occupancy sensor 130. For example, the programming information may include the identifiers of the load control device(s) 110a, 110b, 110c that are to operate in the vacancy mode. Those load control device(s) 110a, 110b, 110c that are unselected may operate in the occupancy mode in response to digital messages transmitted by the occupancy sensor 130. The predetermined amount of time that the vacancy programming button 222 is pressed for entering the vacancy programming mode may be the same as, or different from, the amount of time the vacancy programming button 222 is pressed for exiting the vacancy programming mode. The predetermined amount of time that the vacancy programming button 222 is pressed for entering/exiting the vacancy programming mode may be the same as, or different from, the amount of time the zone programming button 220 is pressed for exiting/entering the zone programming mode.

To assign the daylight sensor 140 to one or more of the load control devices 110a, 110b, 110c, the user may press and hold the daylighting programming button 224 for the a predetermined amount of time (e.g., three seconds) to enter a daylighting programming mode. The visual indicators 232-236 of the visual display 230 may flash after the daylighting programming button 224 has been held for the predetermined amount of time. The user may repetitively press the daylighting programming button 224, while in the daylighting programming mode, to select different load control device(s) 110a, 110b, 110c until the visual indicator(s) 232-236 indicating the desired load control device(s) 110a, 110b, 110c are selected. The selected load control device(s) 110a, 110b, 110c may flash the respective light source(s) 112a, 112b, 112c, to identify the respective load control device(s) 110a, 110b, 110c at this time. The user may press and hold the daylighting programming button 224 for a predetermined amount of time (e.g., three seconds) to exit the daylighting programming mode. The exiting of the daylighting programming mode may be indicated by the visual indicators 232-236 flashing and/or turning off. The zone-control keypad device 200 may transmit (e.g., in response to the exiting of the daylighting programming mode) to the selected load control device(s) 110a, 110b, 110c programming information indicating that the load control device(s) are responsive to the daylight sensor 140. For example, the programming information may include the identifiers of the load control device(s) 110a, 110b, 110c that are to be responsive to digital messages from the daylight sensor 140 (e.g., including the identifier of the daylight sensor 140). The predetermined amount of time that the daylighting programming button 224 is pressed for entering the daylighting programming mode may be the same as, or different from, the amount of time the daylighting programming button 224 is pressed for exiting the daylighting programming mode. The predetermined amount of time that the daylighting programming button 224 is pressed for entering/exiting the daylighting programming mode may be the same as, or different from, the amount of time the zone programming button 220 and/or the vacancy programming button 222 are pressed for exiting/entering the respective programming modes.

To adjust an operating parameter (e.g., the low-end intensity $L_{LE}$, the high-end intensity $L_{HE}$) of one or more of the load control devices 110a, 110b, 110c, the user may press and hold the trim programming button 226 and another button for a predetermined amount of time (e.g., three seconds) to enter a trim programming mode. The visual indicators 232-236 of the visual display 230 may flash after the trim programming button 226 has been held for the predetermined amount of time. For example, the user may press and hold the trim programming button 226 and the on button 212 for the predetermined amount of time to enter a high-end trim programming mode to adjust the high-end intensity $L_{HE}$. The user may press and hold the trim programming button 226 and the off button 214 for the predetermined amount of time to enter a low-end trim programming mode to adjust the low-end intensity $L_{LE}$.

While in the high-end trim programming mode, or the low-end trim programming mode, the user may repetitively press the trim programming button 226 to select different load control device(s) 110a, 110b, 110c until the visual indicator(s) 232-236 indicating the desired load control device(s) 110a, 110b, 110c are selected. The selected load control device(s) 110a, 110b, 110c may flash the respective light source(s) 112a, 112b, 112c to identify the respective load control device(s) 110a, 110b, 110c at this time. The user may actuate the raise and lower buttons 216, 218 to cause the selected load control device(s) 110a, 110b, 110c to adjust the intensities of the respective light source(s) 112a, 112b, 112c. When the intensities of the respective light source(s) 112a, 112b, 112c are at the desired intensity for the parameter, for example, the high-end intensity $L_{HE}$ or the low-end intensity $L_{LE}$, the user may stop actuating the raise and lower buttons 216, 218. The user may press and hold the trim programming button 226 for a predetermined amount of time (e.g., three seconds) to exit the high-end trim programming mode or the low-end trim programming mode. The exiting of the high-end trim programming mode or the low-end trim programming mode may be indicated by the visual indicators 232-236 flashing and/or turning off. The zone-control keypad device 200 may transmit (e.g., in response to the exiting of the high-end trim programming mode or the low-end trim programming mode) to the selected load control device(s) 110a, 110b, 110c programming information indicating the value of the parameter, e.g., the selected intensity for the high-end intensity $L_{HE}$ or the low-end intensity $L_{LE}$. The load control device(s) 110a, 110b, 110c may operate at the indicated parameter.

Figure 3:
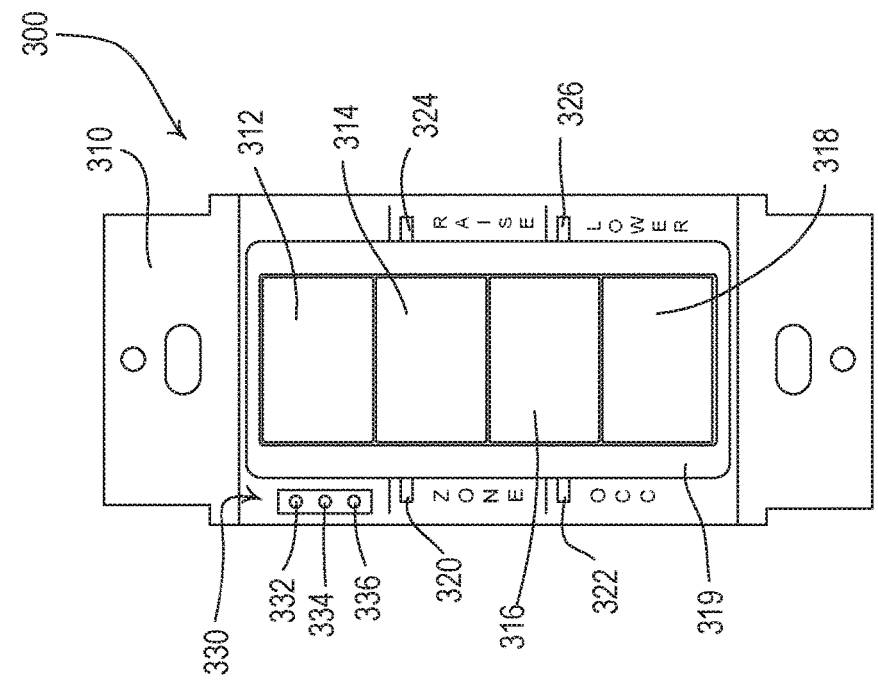
FIG. 3 is a front view of an example preset-control keypad device having a plurality of programming buttons.

FIG. 3 is a front view of an example preset-control keypad device 300, which may be deployed as the preset-control keypad device 160 of the load control system 100a, 110b, 110c shown in FIG. 1. As shown in FIG. 3, the preset-control keypad device 300 may not have a faceplate (e.g., the faceplate 164) mounted to the device. The preset-control keypad device 300 may comprise a yoke 310 for mounting the preset-control keypad device 300 to a standard electrical wallbox. The preset-control keypad device 300 may comprise a plurality of preset buttons 312, 314, 316, 318 provided in a bezel 319. The bezel 319 may be received in the opening of the faceplate when the faceplate is mounted to the yoke 310. The preset-control keypad device 300 may be configured to transmit digital messages for controlling one or more electrical loads (e.g., the light sources 112a, 112b, 112c) in response to actuations of the preset buttons 312-318 (e.g., in a similar manner as the preset-control keypad device 160). For example, the load control devices 110a, 110b, 110c may be configured to adjust the intensities of the respective light sources 112a, 112b, 112c according to a preset (or "scene") in response to one the preset buttons 312-318. The motor drive unit 190 may be configured to adjust the level of the covering material 192 according to a preset (or "scene") in response to one the preset buttons 312-318. A preset may define preset intensities for one or more of the load control devices 110a, 110b, 110c and/or a preset level of the covering material for the motor drive unit 190. Each of the preset buttons 312-318 may select a different preset (and thus a different set of preset intensities and/or levels of the covering materials for load control devices).

The preset-control keypad device 300 may comprise a programming user interface including one or more programming buttons for programming the load control system 100 during a programming mode. For example, the preset-control keypad device 300 may comprise a zone programming button 320 for adjusting which of the load control devices 110a, 110b, 110c are responsive to the digital messages transmitted by the preset-control keypad device 300 in response to actuations of the preset buttons 312-318. The preset-control keypad device 300 may comprise an occupancy programming button 322 to designate which of the load control devices 110a, 110b, 110c are responsive to the digital messages transmitted by the occupancy sensor 130. The preset-control keypad device 300 may also comprise a raise programming button 324 and a lower programming button 326 for configuring presets of the load control system.

The programming user interface of the preset-control keypad device 300 may include a programming visual display 330, which may comprise visual indicators 332, 334, 336 (e.g., LEDs). The visual indicators 332-336 may be illuminated to indicate which of the load control devices 110a, 110b, 110c are selected during the programming mode (e.g., in a similar manner as the visual indicators 232-236 of the zone-control keypad device 200 are illuminated to indicate a selected one or more of the load control devices 110a, 110b, 110c). The preset-control keypad device 300 may comprise a suitable control circuit for receiving inputs from the preset buttons 312-318 and the programming buttons 320-326, and for controlling the visual indicators 332-336. The control circuit may comprise one or more of a processor (e.g., a microprocessor), a microcontroller, a programmable logic device (PLD), a field programmable gate array (FPGA), an application specific integrated circuit (ASIC), or any suitable processing device. The control circuit may also be coupled to a communication circuit to provide for communication (e.g., transmission and reception) of the digital messages on a digital communication link (e.g., the digital communication link 104).

The programming buttons 320-326 and the visual display 330 may be located in the yoke 310 adjacent to the bezel 319 and may be covered by a faceplate mounted to the yoke 310. The programming buttons 320-326 and the visual display 330 may be exposed to a user when the faceplate is not mounted to the preset-control keypad device 300 as shown in FIG. 3.

To configure a preset for one of the preset buttons 312-318 of the preset-control keypad device 300, the user may press and hold the zone programming button 320 for a predetermined amount of time (e.g., three seconds) until the visual indicators 332-336 to enter a zone preset programming mode. The visual display 330 may flash after the zone preset programming mode has been held for the predetermined amount of time. The user may repetitively press the zone programming button 320, while in the zone preset programming mode, to select different load control device(s) 110a, 110b, 110c until the visual indicator(s) 332-336 indicating the desired load control device(s) 110a, 110b, 110c are selected. The selected load control device(s) 110a, 110b, 110c may flash the respective light source(s) 112a, 112b, 112c, and/or move the covering material 192, to identify the respective load control device(s) 110a, 110b, 110c at this time.

The user may actuate the raise and lower programming buttons 324, 326 to cause the selected load control device(s) 110a, 110b, 110c to adjust the intensities of the respective light source(s) 112a, 112b, 112c, or cause the level of the covering material 192 to be adjusted. The user may actuate the zone programming button 320 again until the visual indicator(s) 332-336 indicate that one or more other load control device(s) 110a, 110b, 110c are selected, and actuate the raise and lower programming buttons 324, 326 to adjust the intensities of the light source(s) 112a, 112b, 112c, or cause the level of the covering material 192 to be adjusted. The user may repeat this process until the intensities of the respective light source(s) 112a, 112b, 112c, and/or the level of the covering material 192 are at the desired intensities for the scene. At this time, the user may press and hold a desired one of the preset buttons 312-318 (to which to assign the preset being configured) for a predetermined amount of time (e.g., three seconds) to exit the zone preset programming mode. The exiting of the zone preset programming mode may be indicated by the visual indicators 332-336 flashing and/or turning off. The preset-control keypad device 300 may then transmit (e.g., in response to the exiting of the zone preset programming mode) data indicating the selected preset button and the values of the preset intensities for the preset to the selected load control device(s) 110a, 110b, 110c. For example, the preset-control keypad device 300 may transmit a zone preset identifier for which the selected load control device(s) 110a, 110b, 110c may be responsive when the zone preset identifier is identified in digital messages. The load control device(s) 110a, 110b, 110c may control the intensities of the respective light source(s) 112a, 112b, 112c to the levels indicated by the configured preset. The load control device(s) 110a, 110b, 110c may store the presets in memory and may subsequently control the respective light source(s) 112a, 112b, 112c to the configured levels when the selected preset button is actuated. The predetermined amount of time that the zone programming button 320 is pressed for entering the zone preset programming mode may be the same as, or different from, the amount of time the zone programming button 320 is pressed for exiting the zone preset programming mode.

To configure a preset to be selected in response to the occupancy sensor 130, the user may press and hold the occupancy programming button 322 for a predetermined amount of time (e.g., three seconds) to enter an occupancy preset programming mode. The visual indicators 332-336 of the visual display 330 may flash after the occupancy programming button 322 has been held for the predetermined amount of time. The user may select one of the previously-configured presets to be selected when the load control device(s) 110a, 110b, 110c receive a digital message indicating occupancy from the occupancy sensor 130. To select a preset, the user may press and hold one of the preset buttons 312-318 for a predetermined amount of time. When the preset is selected for the predetermined amount of time, the visual indicators 332-336 may flash and/or turn off to indicate the selection of the preset. The zone-control keypad device 300 may transmit data indicating the occupancy sensor (e.g., a serial number) and an identifier (e.g., a preset number) of the selected preset to the selected load control device(s) 110a, 110b, 110c. Alternatively, or additionally, the zone-control keypad device 300 may transmit data including the values of the preset intensities and/or levels of the covering materials for the selected preset to the selected load control device(s) 110a, 110b, 110c. The load control device(s) 110a, 110b, 110c may control the intensities of the respective light source(s) 112a, 112b, 112c to the preset intensities of the selected preset. The user may press and hold the occupancy programming button 322 for the predetermined amount of time (e.g., three seconds) to exit the occupancy preset programming mode. The visual indicators 332-336 may flash and/or turn off to indicate the exiting of the occupancy preset programming mode.

Though one or more types of load control devices are described herein, one or more other types of load control devices may be similarly implemented. For example, FIGS. 1-3 may reference a number of load control devices for controlling a lighting load and/or a motorized window treatment, though any number of load control devices (e.g., lighting control devices, electric motors for motorized window treatments, etc.) may be implemented.

Figure 4:
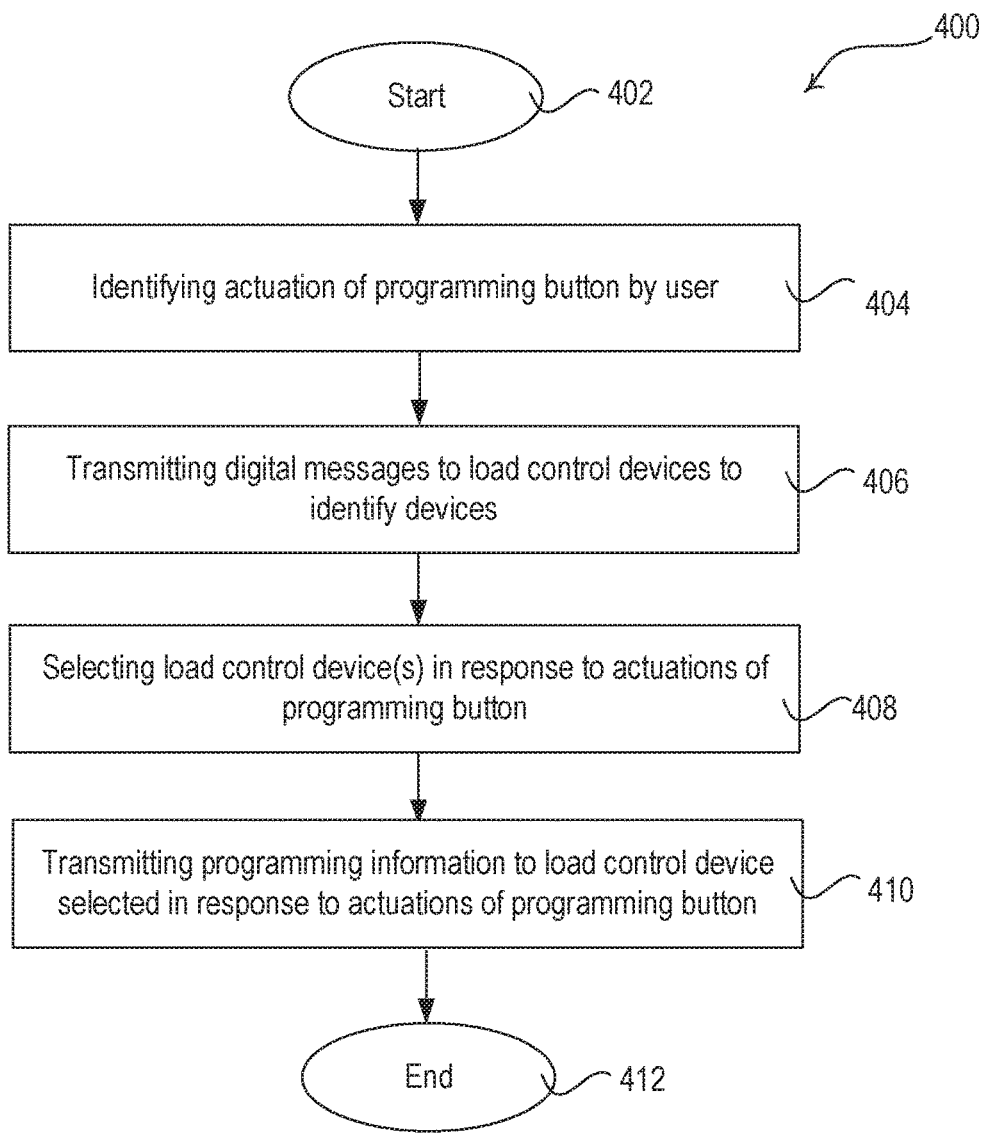
FIG. 4 is a flow diagram of an example method for controlling power delivered to respective electrical loads.

FIG. 4 is a flow diagram of an example method 400 for programming load control devices for controlling power delivered to electrical loads. The method 400 may be performed by one or more control devices in a load control system, such as the load control system 100 shown in FIG. 1. The method 400 may be performed on a single device, or may be distributed across multiple devices. For example, the method 400, or portions thereof, may be performed by a keypad device, such as a zone-control keypad device 150 and/or a preset-control keypad device 160.

The method 400 may begin at 402. At 404, a control device (e.g., the keypad device, such as the zone-control keypad device 150 and/or the preset-control keypad device 160) may identify an actuation of a programming button by a user. For example, a programming button on a keypad device may be configured to be actuated by a user and the keypad device may identify the actuation. The keypad device may comprise a programming user interface including programming buttons for adjusting the operation of the load control system. For example, the programming buttons of the keypad device may be actuated to adjust which of the load control devices 110a, 110b, 110c may be responsive to a device (e.g., which of the load control devices may be responsive to the occupancy sensor 130, the daylight sensor 140, the zone-control keypad device 150, and/or the preset-control keypad device 160). The programming buttons of the keypad device may be actuated to adjust an operating parameter of the load control system, such as, for example, the low-end intensity $L_{LE}$, the high-end intensity $L_{HE}$, a level of a covering material, and/or a preset intensity or level of one or more of the load control devices.

To select one or more load control devices, a user may press and hold, and/or consecutively actuate, a programming button for a predetermined amount of time. For example, a user may press and hold a programming button for a predetermined amount of time until visual indicators flash indicating the selected load control device(s). The user may press the programming button until the visual indicator indicating the desired load control device(s) are selected (e.g., to cycle through the load control devices and/or groups of the load control devices).

At 406, digital messages may be transmitted to one or more selected load control devices (such as load control devices 110a, 110b, 110c) via a digital communication link to identify the devices upon actuation of the programming button. Upon actuation of the programming button, the keypad may transmit digital messages to instruct one or more load control device(s) to flash the respective light source(s), flash a respective LED indicator thereon, and/or move the respective covering material to identify the load control device(s) to identify the corresponding load control devices. The digital messages may include an identifier of the devices to identify themselves. In response to the selection of the programming button, digital messages may be sent to different devices, or combinations of devices.

At 408, one or more load control devices may be selected for receiving programming information. For example, load control devices may be selected in response to the one or more actuations of a programming button (e.g., programming button on a keypad device). Load control devices may be selected in response to successive actuations of the programming button.

At 410, programming information may be generated and transmitted to one or more load control devices in response to the successive actuations of the programming button. For example, a keypad device may generate and transmit programming information to load control devices (e.g., selected load control device(s)) to configure the load control device(s) to be responsive to the keypad device, or other external devices. The keypad device may be configured to adjust the operation of the load control system 100, e.g., to override the default configuration in response to programming information.

The programming information may determine which of the load control devices and/or the electrical outlet control device may be responsive to digital messages transmitted on the digital communication link. The programming information may comprise serial numbers or other unique identifiers of one or more of the input devices (such as occupancy sensor 130, the daylight sensor 140, the zone-control keypad device 150, and/or the preset-control keypad device 160) with which the load control devices may be programmed.

The programming information may also include serial numbers or other unique identifiers of the load control device(s) that are selected for programming in response to the actuations of the programming button. For example, the programming buttons of the keypad device may be actuated to choose which of the load control devices 110a, 110b, 110c, the motor drive unit 190, and/or the electrical outlet control device 120 may be responsive to the occupancy sensor 130 and/or the keypad device itself. The keypad device may transmit a serial number of the occupancy sensor 130 or the keypad device itself to the selected load control devices 100 and/or the electrical outlet control device 120, which may store the serial number in memory and may subsequently be responsive to digital messages including the stored serial numbers.

The user may press and/or hold the programming button for a predetermined amount of time to exit the programming mode. When the programming mode is exited, the visual indicators on the keypad may flash and/or turn off. The keypad device (such as zone-control keypad device 150 and/or preset-control keypad device 160) may be configured to transmit programming information to the load control devices 110a, 110b, 110c, the motor drive unit 190, and/or the electrical outlet control device 120 in response to actuations of the respective programming buttons. The method 400 may end at 412.

Figure 5:
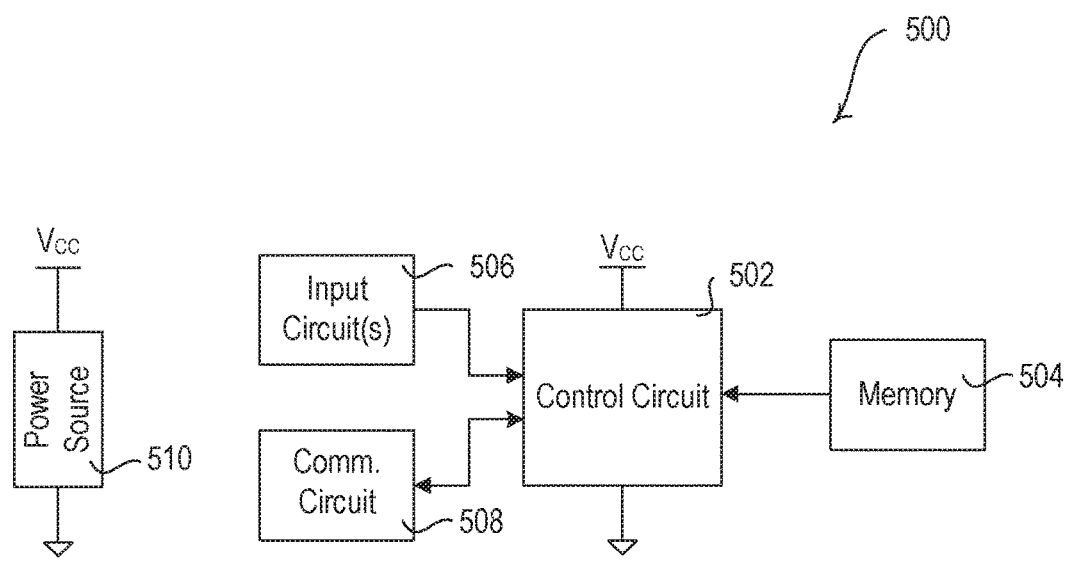
FIG. 5 is a block diagram of an example input device.

FIG. 5 is a block diagram illustrating an example input device e.g., an input device 500, as described herein. The input device 500 may be an occupancy sensor, a daylight sensor, a window sensor, a temperature sensor, a keypad device (e.g., a zone-control keypad device 150 and/or a preset-control keypad device 160) or other remote control device, and/or another type of input device. The input device 500 may include a control circuit 502 for controlling the functionality of the input device 500. The control circuit 502 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 502 may perform signal coding, data processing, power control, input/output processing, and/or any other functionality that enables the input device 500 to perform as described herein. The control circuit 502 may store information in and/or retrieve information from the memory 504. The memory 504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The control circuit 502 may access executable instructions in the memory 504 for performing as described herein.

The input device 500 may include a communication circuit 508 for transmitting and/or receiving information. The communication circuit 508 may transmit and/or receive information via wired and/or wireless communications. The communication circuit 508 may include a transmitter, a receiver, an RF transceiver, or other circuit capable of performing wired and/or wireless communications. The communication circuit 508 may be in communication with control circuit 502 for transmitting and/or receiving information.

The control circuit 502 may also be in communication with an input circuit 506. The input circuit 506 may include one or more actuators (e.g., one or more buttons) and/or a sensor circuit (e.g., an occupancy sensor circuit, a daylight sensor circuit, or a temperature sensor circuit) for receiving input that may be sent to a device for programming and/or controlling an electrical load. For example, the input device 500 may receive input from the input circuit 506 to put the control circuit 502 in a programming mode and/or communicate digital messages from the input device 500. The control circuit 502 may receive information from the input circuit 506 (e.g. an indication that a button has been actuated or sensed information has been received). Each of the modules within the input device 500 may be powered by a power source 510.

Figure 6:
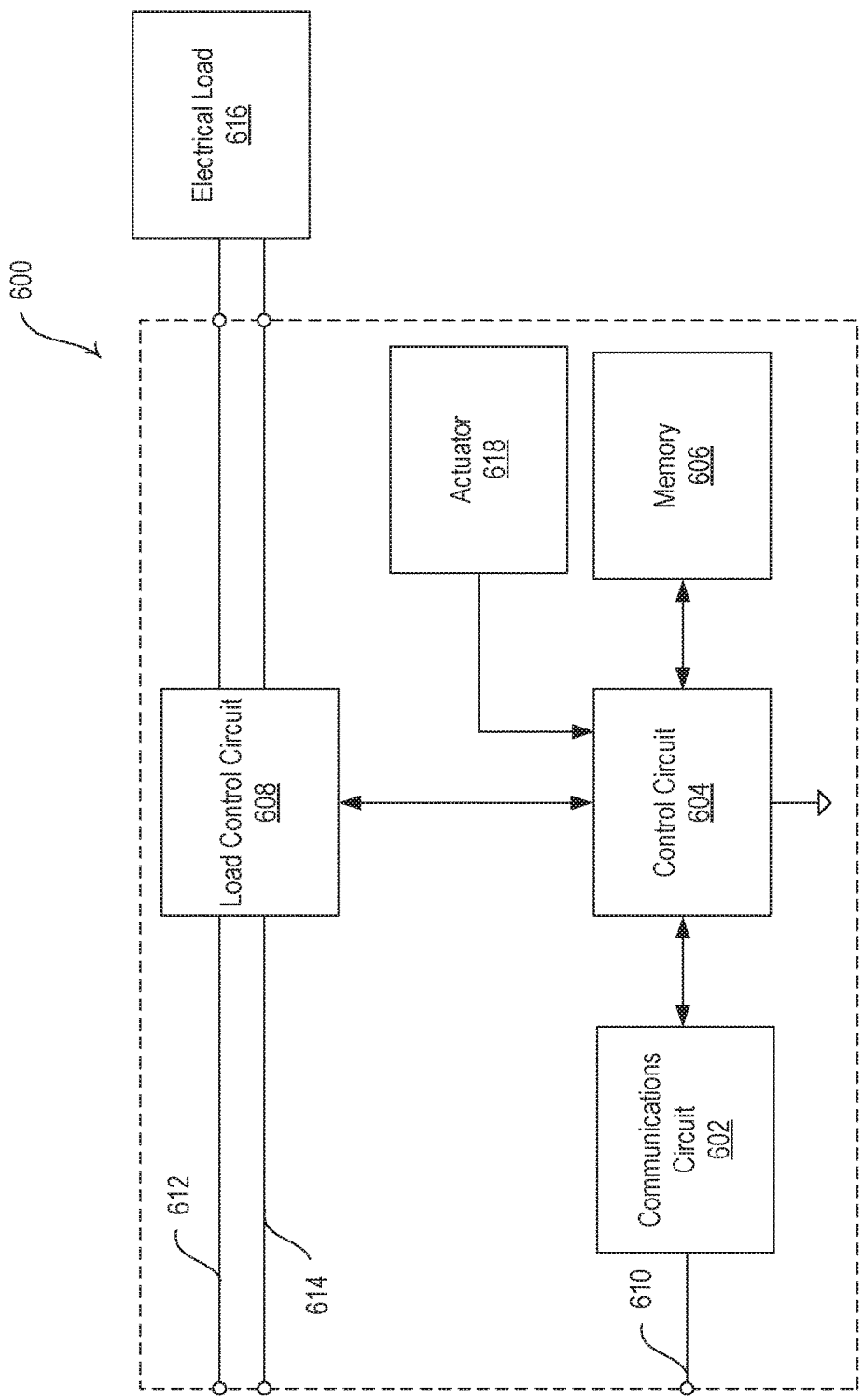
FIG. 6 is a block diagram of an example load control device.

FIG. 6 is a block diagram illustrating an example load control device 600. The load control device 600 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 600 may include a communication circuit 602. The communication circuit 602 may include a receiver, a transmitter, an RF transceiver, or other communications module capable of performing wired and/or wireless communications via communications link 610. For example, the communication circuit 602 may be capable of communicating (e.g., with a network device, over a network, etc.) via a wireless communication channel (e.g., BLUETOOTH®, near field communication (NFC), WIFI®, WI-MAX®, cellular, etc.). The communications circuit 602 may allow the load control device to function as an access point (AP).

The communication circuit 602 may be in communication with control circuit 604. The control circuit 604 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 604 may perform signal coding, data processing, power control, input/output processing, and/or any other functionality that enables the load control device 600 to perform as described herein.

The control circuit 604 may store information in and/or retrieve information from the memory 606. For example, the memory 606 may maintain a registry of programmed control devices after receiving digital messages indicating the devices with which the load control device 600 is programmed. The memory 606 may include a non-removable memory and/or a removable memory, as described herein. The control circuit 604 may access executable instructions in the memory 606 for performing as described herein. The load control circuit 608 may receive instructions from the control circuit 604 and may control the electrical load 616 based on the received instructions. The load control circuit 608 may send status feedback to the control circuit 604 regarding the status of the electrical load 616. The load control circuit 608 may receive power via the hot connection 612 and the neutral connection 614 and may provide an amount of power to the electrical load 616. The electrical load 616 may include any type of electrical load.

The control circuit 604 may be in communication with an actuator 618 (e.g., one or more buttons) that may be actuated by a user to communicate user selections to the control circuit 604. For example, the actuator 618 may be actuated to put the control circuit 604 in an association mode and/or communicate association messages from the load control device 600.

Figure 7:
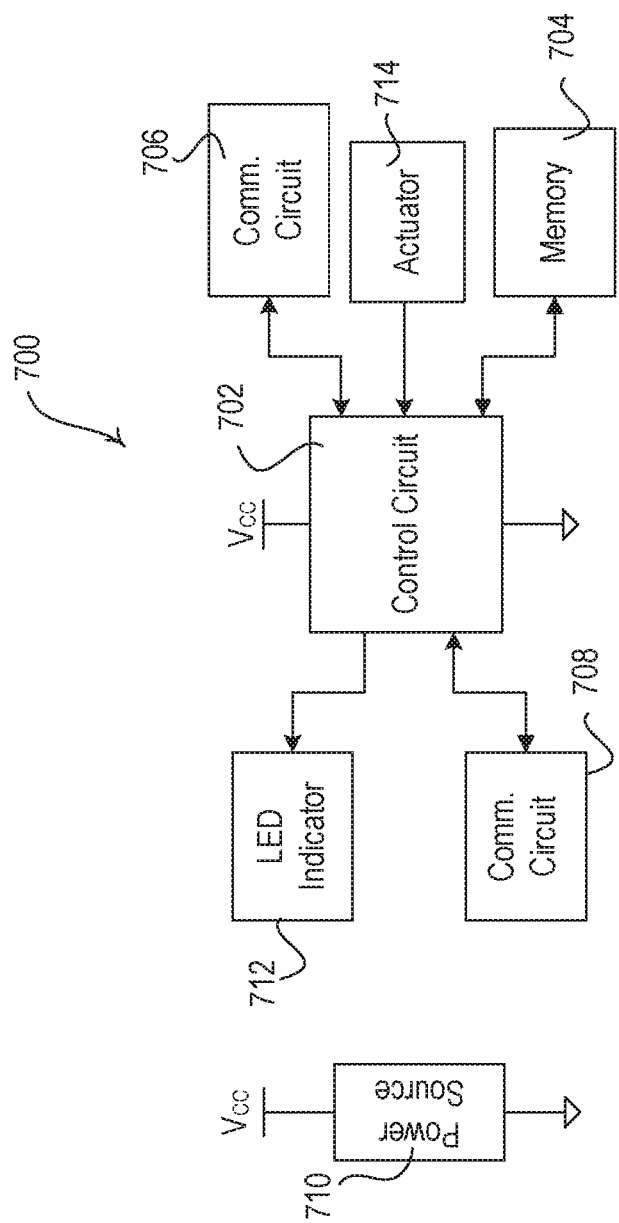
FIG. 7 is a block diagram of an example system controller.

FIG. 7 is a block diagram illustrating an example system controller 700 as described herein. The system controller 700 may include a control circuit 702 for controlling the functionality of the system controller 700. The control circuit 702 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 702 may perform signal coding, data processing, power control, input/output processing, and/or any other functionality that enables the system controller 700 to perform as described herein. The control circuit 702 may store information in and/or retrieve information from the memory 704. The memory 704 may include a non-removable memory and/or a removable memory, as described herein. The control circuit 702 may access executable instructions in the memory 704 for performing as described herein.

The system controller 700 may include a communication circuit 706 for transmitting and/or receiving information. The communication circuit 706 may perform wireless and/or wired communications. The system controller 700 may also, or alternatively, include a communication circuit 708 for transmitting and/or receiving information. The communication circuit 708 may perform wireless and/or wired communications. Communication circuit 706 and 708 may be in communication with control circuit 702. The communication circuit 706 and 708 may include RF transceivers, receivers, transmitters, or other communications modules capable of performing wireless communications via an antenna. The communication circuit 706 and communication circuit 708 may be capable of performing communications via the same communication channels or different communication channels. For example, the communication circuit 706 may be capable of communicating (e.g., with a network device, over a network, etc.) via a wireless communication channel (e.g., BLUETOOTH®, near field communication (NFC), WIFI®, WI-MAX®, cellular, etc.) and the communication circuit 708 may be capable of communicating (e.g., with control devices and/or other devices in the load control system) via another wireless communication channel (e.g., WI-FI® or a proprietary communication channel, such as CLEAR CONNECT™).

The control circuit 702 may be in communication with an LED indicator 712 for providing indications to a user. The control circuit 702 may be in communication with an actuator 714 (e.g., one or more buttons) that may be actuated by a user to communicate user selections to the control circuit 702. For example, the actuator 714 may be actuated to put the control circuit 702 in an association mode and/or communicate association messages from the system controller 700.

Each of the modules within the system controller 700 may be powered by a power source 710. The power source 710 may include an AC power supply or DC power supply, for example. The power source 710 may generate a supply voltage $V_{CC}$ for powering the modules within the system controller 700.

Figure 8:
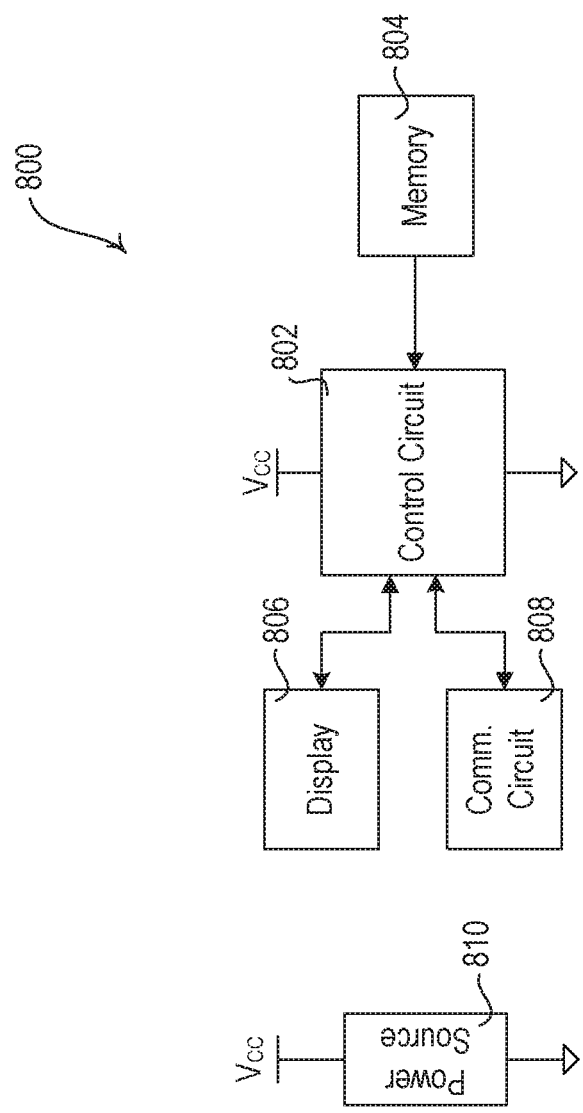
FIG. 8 is a block diagram of an example network device.

FIG. 8 is a block diagram illustrating an example network device 800 as described herein. The network device 800 may include a user device, for example. The network device 800 may include a control circuit 802 for controlling the functionality of the network device 800. The control circuit 802 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 802 may perform signal coding, data processing, power control, image processing, input/output processing, and/or any other functionality that enables the network device 800 to perform as described herein.

The control circuit 802 may store information in and/or retrieve information from the memory 804. The memory 804 may include a non-removable memory and/or a removable memory, as described herein. The control circuit 802 may access executable instructions in the memory 804 for performing as described herein.

The network device 800 may include a communication circuit 808 for transmitting and/or receiving information via wired and/or wireless signals. For example, the communications circuit 808 may include an RF transceiver for transmitting and/or receiving RF signals via an antenna, a transmitter, a receiver, or other communications module capable of performing wired and/or wireless communications. Communications circuit 808 may be in communication with the control circuit 802.

The control circuit 802 may also be in communication with a display 806 for providing information to a user. The communication between the display 806 and the control circuit 802 may be a two way communication, as the display 806 may include a touch screen module capable of receiving indications from a user and providing such indications to the control circuit 802. Each of the modules within the computing device 800 may be powered by a power source 810. The power source 810 may include an AC power supply or DC power supply, for example. The power source 810 may generate a DC supply voltage $V_{CC}$ for powering the modules within the computing device 800.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A control device for use in a load control system having a first load control device and a second load control device configured to control power delivered to a first electrical load and a second electrical load, respectively, the control device comprising:
a programming user interface having a programming button configured to be actuated by a user;
a communication circuit configured to transmit digital messages to the first load control device and the second load control device via a digital communication link; and
a control circuit responsive to actuations of the programming button, the control circuit configured to select at least one of the first load control device and the second load control device in response to successive actuations of the programming button;
wherein the control circuit is configured to cause the communication circuit to transmit programming information to the at least one of the first load control device and the second load control device selected in response to the successive actuations of the programming button.

2. The control device of claim 1, further comprising:
at least one control button for receiving a user input;
wherein the control circuit is configured to transmit a digital message to the at least one of the first load control device or the second load control device on the digital communication link for controlling the at least one of the first electrical load and the second electrical load in response to an actuation of the at least one control button.

3. The control device of claim 2, wherein the first electrical load and the second electrical load comprise lighting loads, and wherein the at least one control button comprises a preset button for selecting a preset to control one or more of the lighting loads to preset intensities.

4. The control device of claim 3, wherein the programming information comprises the preset intensities to which the lighting loads are to be controlled in response to the actuation of the preset button.

5. The control device of claim 2, wherein the at least one control button comprises at least one of an on button, an off button, a raise button, or a lower button.

6. The control device of claim 2, wherein the programming information determines which of the at least one of the first load control device and the second load control device is responsive to digital messages that are transmitted by an external control device on the digital communication link.

7. The control device of claim 2, further comprising:
a faceplate having an opening through which the at least one control button is received;
wherein the programming user interface is located behind the faceplate when the faceplate is mounted to the control device.

8. The control device of claim 1, wherein the programming user interface further comprises at least two visual indicators configured to be controllably illuminated in response to the control circuit, the control circuit configured to controllably illuminate at least one of the at least two visual indicators to indicate when the at least one of the first load control device and the second load control device is selected in response to the successive actuations of the programming button.

9. The control device of claim 8, wherein the control circuit is configured to illuminate a single visual indicator to indicate that a single load control device is selected.

10. The control device of claim 8, wherein the control circuit is configured to illuminate multiple visual indicators to indicate that multiple load control devices are selected.

11. The control device of claim 1, wherein the programming information comprises a desired value for a parameter of the at least one of the first load control device and the second load control device.

12. The control device of claim 11, wherein the parameter of the at least one of the first load control device and the second load control device comprises a low-end intensity, a high-end intensity, a preset intensity, or a predefined level of a covering material.

13. The control device of claim 1, wherein the programming information is configured to determine which of the at least one of the first load control device and the second load control device is responsive to the digital messages that are transmitted by an external control device on the digital communication link.

14. The control device of claim 13, wherein the external control device comprises at least one of an occupancy sensor and a daylight sensor.

15. The control device of claim 1, wherein the first electrical load and the second electrical load comprise lighting loads, and wherein the control circuit is configured to control the at least one of the first load control device and the second load control device to controllably illuminate each of the lighting loads to identify the at least one of the first load control device and the second load control device that is selected in response to the successive actuations of the programming button.

16. The control device of claim 1, wherein the digital communication link comprises a wired digital communication link.

17. A method of programming a load control system having a first load control device and a second load control device configured to control power delivered to a first electrical load and a second electrical load, respectively, the method comprising:
   identify actuations of a programming button on a programming user interface by a user;
   selecting at least one of the first load control device and the second load control device in response to successive actuations of the programming button; and
   transmitting programming information to the at least one of the first load control device and the second load control device in response to the successive actuations of the programming button.

18. The method of claim 17, further comprising:
   controllably illuminating at least one of at least two visual indicators to indicate when the at least one of the first load control device and the second load control device is selected in response to the successive actuations of the programming button.

19. The method of claim 18, wherein controllably illuminating the at least one of the at least two visual indicators further comprises:
   illuminating a single visual indicator to indicate that a single load control device is selected; and
   illuminating multiple visual indicators to indicate that multiple load control devices are selected.

20. The method of claim 17, further comprising:
   receiving, via at least one control button, a user input; and
   transmitting a digital message to the at least one of the first load control device and the second load control device on a digital communication link for controlling the at least one of the first electrical load and the second electrical load in response to the user input via the at least one control button.

* * * * *